(12) United States Patent
Cook (10) Patent No.: US 6,570,574 B1
(45) Date of Patent: May 27, 2003

(54) VARIABLE PRE-FETCHING OF PIXEL DATA

(75) Inventor: Val G. Cook, Shingle Springs, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/480,849

(22) Filed: Jan. 10, 2000

(51) Int. Cl.$^7$ ................................................. G06T 11/40

(52) U.S. Cl. ...................................................... 345/582

(58) Field of Search ................................ 345/530–574, 345/582; 710/711; 711/1, 3, 137, 204, 205, 213; 712/207, 213, 237

(56) References Cited

U.S. PATENT DOCUMENTS 5,781,200 A * 7/1998 Lu et al. ..................... 345/516
5,864,342 A * 1/1999 Kajiya et al. ............... 345/418

* cited by examiner

Primary Examiner—Jeffery Brier
Assistant Examiner—G. F. Cunningham
(74) Attorney, Agent, or Firm—Blakely, Sokoloff, Taylor & Zafman LLP (57) ABSTRACT

A system and method for pre-fetching pixels of pixel data for display functions requiring retrieval of pixels from a storage device for which the degree of effectiveness of pre-fetching differs among the display functions wherein 2-dimensional blocks of pixels are pre-fetched having a width and height that vary depending the display function that will be performed on the retrieved pixels after they have been retrieved from the storage device.

26 Claims, 5 Drawing Sheets

VARIABLE PRE-FETCHING OF PIXEL DATA

FIELD OF THE INVENTION

The present invention is related to a system and method for the variable pre-fetching of pixel data.

ART BACKGROUND

Common functions of display systems are the display of different types of data, including motion video and 3-dimensional objects.

The display of motion video often occurs in the context of the playback of motion video data from a disk storage device or the receipt and display of motion video transmitted from a remote source. It is a common practice to compress motion video data due to the large quantities of storage it often requires in its uncompressed state. One process used in widely accepted compression methods begins by making comparisons between frames of motion video data to detect locations within each frame that carry similar images. If such a similar image is found, then a portion of video data, comprised of a block of pixel data representing a 2-dimensional block of pixels carrying the image, may be stored or transmitted with one of the frames, and at least one other frame will carry information referring to that 2-dimensional block of pixels to be used in recreating that frame when the video data is decompressed. This method of compression is often advantageous where there are moving objects shown in the video data; hence, the term motion estimation describes the compression process and the term motion compensation describes the decompression process. Performing motion compensation involves making copies of the 2-dimensional block of pixels carried by one frame, and using those pixels to recreate a corresponding 2-dimensional block of pixels carrying a similar image for one or more other frames carrying a reference to the copy. displaying 3-dimensional objects, perspective views of 3-dimensional objects are created from a model defining the shape of the object and blocks of pixel data representing 2-dimensional blocks of pixels called texture maps that provide patterns or textures to be drawn on the surfaces of the object. Additional data describes the mapping of the pixels of a texture map to the surfaces of the object. The process of drawing textures carried by texture maps onto the surface of an object is called texture mapping.

A random access memory (RAM) of the kind commonly used in display systems tends to be organized in rows and columns of storage locations that each store one or more bits. Accesses that cross row boundaries within such a RAM device often result in greater latencies than accesses limited to columns within a row. A RAM device of the type commonly used in display systems can be accessed most efficiently by starting at the address of one of its storage locations and sequentially iterating through adjacent storage locations.

Commonly available display devices, such as cathode ray tube displays, tend to require pixel data to be transmitted to them starting with the left most pixel in the upper most row and going across the row to the right, and so on through each successive row. This has encouraged the common practice of storing the pixel data as a contiguous series of pixels organized in like manner. Though advantageous for display purposes, this adds latencies to accesses for such processes as motion compensation and texture mapping. In both processes, pixel data representing a 2-dimensional block of pixels is retrieved that has a width in pixels far less than the block of pixels stored in the RAM device. This frequently causes the retrieving of a block of pixels to be comprised of multiple smaller accesses that are more to likely cross row boundaries within a RAM device, and thereby incurring greater latencies than would retrieving the same quantity of pixels in a single contiguous access.

RAM devices used in display systems are often used to store many different pieces of data, with different components of the display system competing for access to these RAM devices to retrieve these pieces of data. With each of these pieces of data often residing at locations in different rows of a RAM device, any access made by any component of the display system to a RAM device will often incur latencies from accessing a different row from recently accessed rows. This problem is further exacerbated when a RAM device is shared between the display device and other devices within a computer, as in the case of so-called "unified memory architecture" computer systems where a RAM device is shared between a display system and a CPU of the computer system.

One solution has been "address grouping" where the number of times that row boundaries are crossed is reduced by storing and grouping accesses for individual pixels together into groups of accesses to pixels in storage locations within the same row of a storage device. This has been done by incorporating buffers that store requests by components of a display system to retrieve pixels, grouping those requests together into larger requests. However, by design, this results in requests for pixels being delayed, thereby possibly reducing the performance of each such component of the display system. To counteract this effect of such delays, it is often necessary to add complexity to the components of a display system that make these requests by augmenting such components with storage devices to track what was to be done with each of the pixels requested when they are retrieved after such delays.

Finally, it has long been a common practice in the design of display systems to employ entirely separate logic and software for differing functions, such that hardware and/or software to counteract such latencies is often not shared between components of a display system.

SUMMARY OF THE INVENTION

A system and method for pre-fetching pixel data for at least two display functions requiring retrieval of pixels from a storage device for which the degree of effectiveness of pre-fetching differs among the display functions wherein requests to retrieve pixels from the storage device are expanded into a request to retrieve at least one 2-dimensional block of pixels the width and height of which vary depending on which one of the display functions will be performed on the pixels after they have been retrieved from the storage device.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The example embodiments of the present invention are described in the context of retrieving pixels in support of performing motion compensation and texture mapping, both of which are processes well known to those skilled in the art of video decompression and 3-dimensional rendering, respectively. In both processes, frequent accesses are made to a RAM device to retrieve 2-dimensional blocks of pixels. Commonly used RAM devices have storage locations for storing one or more bits of data organized into rows and columns, accesses that cross rows incurring greater latencies than accesses that cross columns, alone. Retrieving 2-dimensional blocks of pixels with a width less than the width of the frame or texture map from which the block is retrieved results in multiple non-contiguous accesses being made to the RAM device, with a likelihood that the series of accesses will cross row boundaries within the organization of storage locations of the RAM device. Therefore, it may be desirable to pre-fetch texture map or motion compensation data to counteract the loss of efficiency of the accesses resulting from the latencies incurred, but the degree to which pre-fetching is able to counteract this loss of efficiency differs between motion compensation and texture mapping. However, the present invention is applicable to a variety of forms of processing in a display system that necessitate making such non-contiguous accesses to a RAM device, and for which pre-fetching shows differing degrees of effectiveness in counteracting this problem. Other display functions include, but are not limited to, interpolation from one resolution to another and other processes in which 2-dimensional arrays of pixels are copied from a source to a destination.

Figure 1:
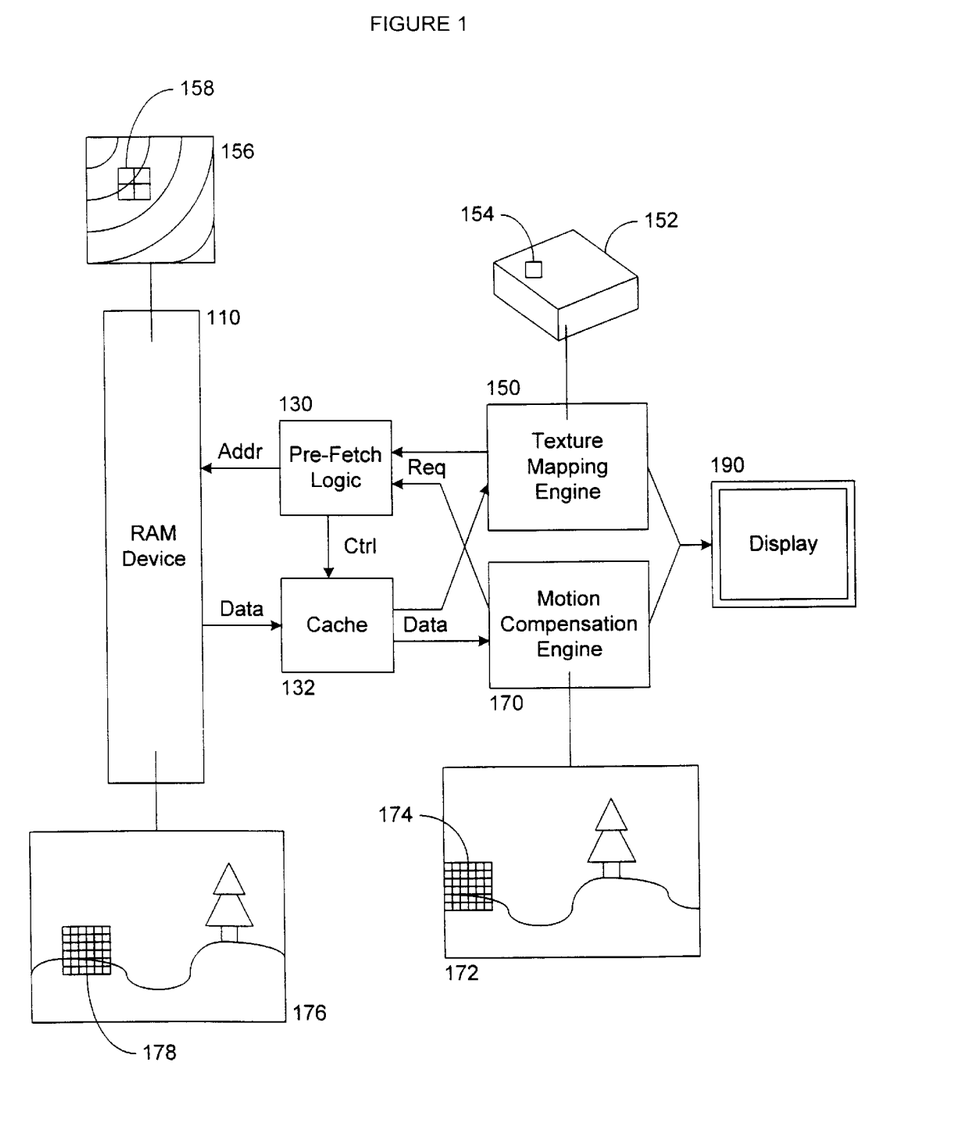
FIG. 1 is a simplified block diagram of one embodiment of a portion of a display system.
Figure 2A:
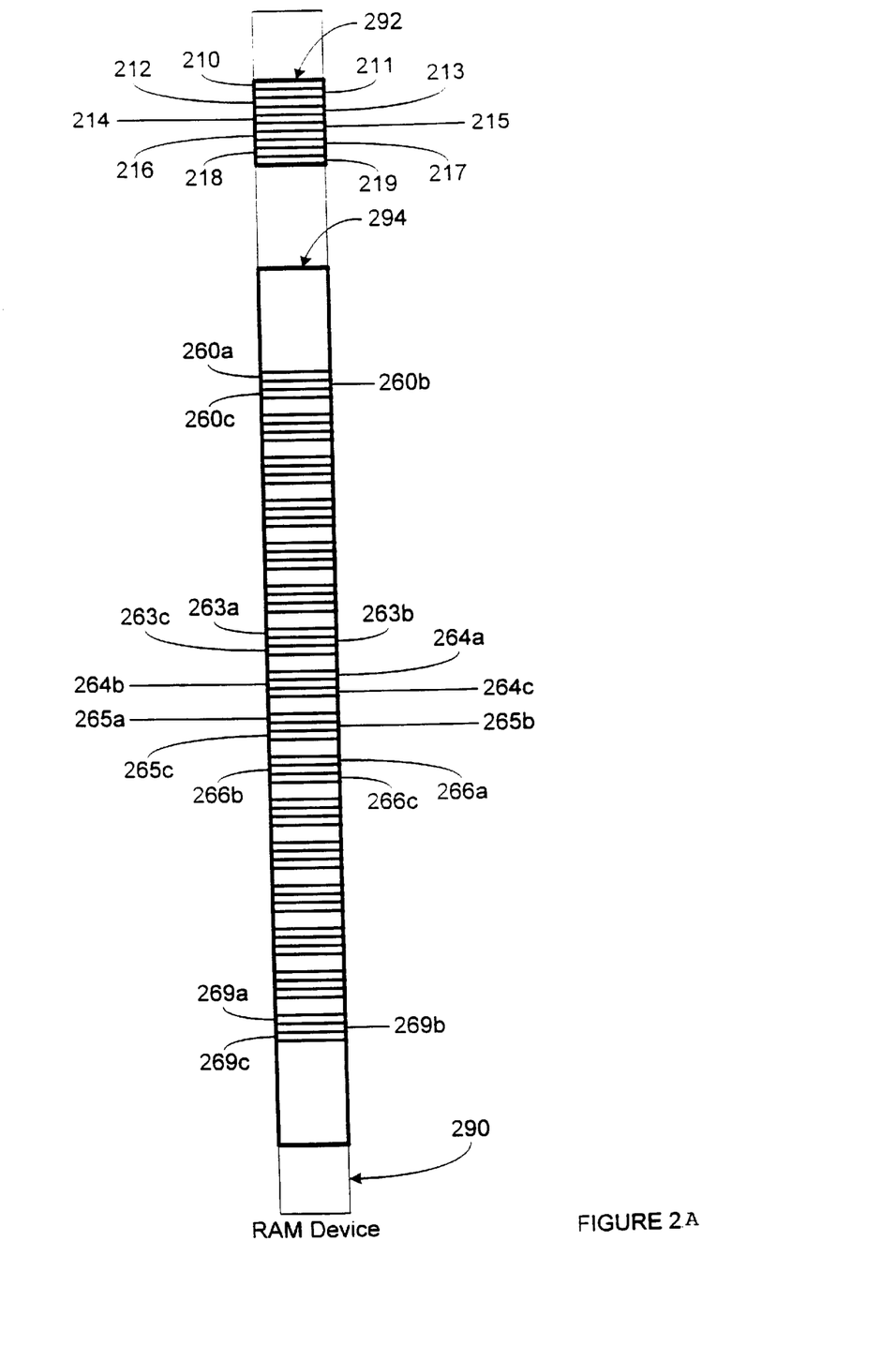
FIGS. 2a–e are a method for pre-fetching pixel data.
Figure 2B:
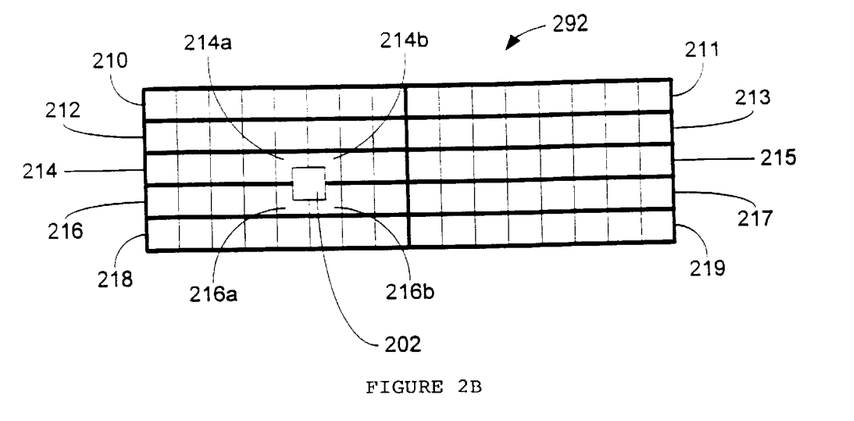
Figure 2C:
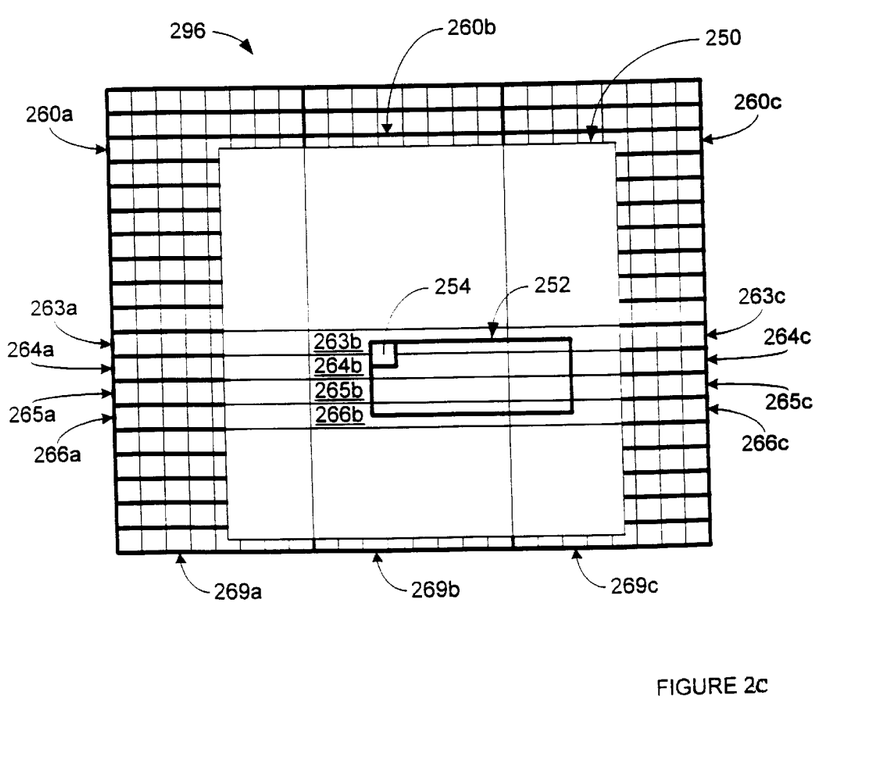
Figure 2D:
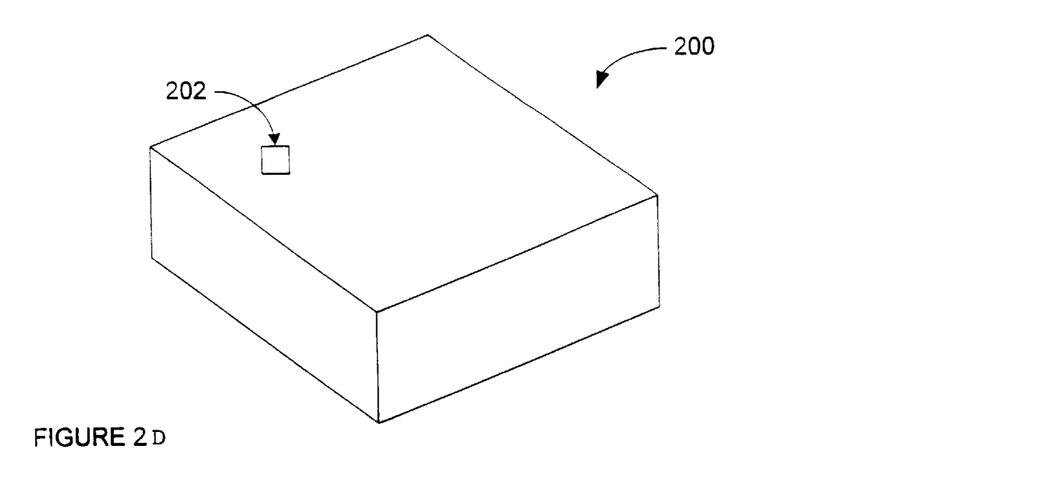
Figure 2E:
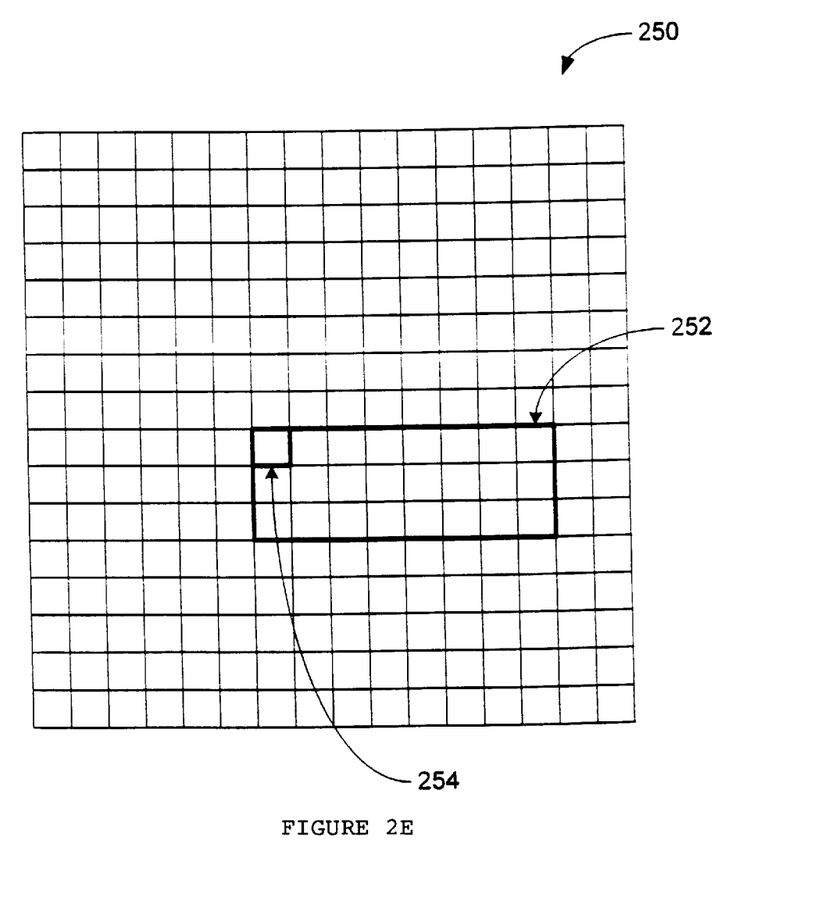

An embodiment of a portion of a display system is depicted in FIG. 1, and includes RAM device 110 coupled to pre-fetch logic 130 and cache 132, which are in turn, coupled to each other as well as to texture mapping engine 150 and motion compensation engine 170, which are in turn, coupled to display 190. Pre-fetch logic 130 accommodates the differing degrees to which pre-fetching can improve the efficiency of non-contiguous accesses to RAM device 110 by varying the number of rows and/or columns of pixel data that are pre-fetched.

Since a texture map is a 2-dimensional pattern, of which portions are applied to surfaces of a 3-dimensional object that are being shown in perspective, it is often necessary to copy more than one pixel of a texture map to derive the data for a pixel making up the image of the surface of a 3-dimensional object. Indeed, it is on rare occasions that only 1 pixel need be copied from a texture map. It is often the case that the process of texture mapping is such that there is no reliable way to predict what pixels of a texture map will next need to be copied. Therefore, despite the desirability to counteract the aforedescribed inefficiencies inherent in retrieving 2-dimensional blocks of pixels by such techniques as pre-fetching, it is often the case that little or no pre-fetching of pixels from a texture map is performed beyond copying the pixels needed to derive the data for a single pixel of the image of a 3-dimensional object. For these reasons, retrieving a 2×2 block of pixels from a texture map is often most desirable.

Object 152 is a 3-dimensional object to be displayed in perspective on display 190. As part of drawing a texture on the surface of object 152 at the location of pixel 154, texture mapping engine 150 makes a request to pre-fetch logic 130 for a copy of a pixel of texture map 156 carried in RAM device 110. Pre-fetch logic 130 responds to the request from texture mapping engine 150 by effecting the retrieval of block of pixels 158 from texture map 156, as well as the storage of block of pixels 158 in cache 132. Block of pixels 158 is a 2×2 block of pixels and contains the pixel requested by texturing mapping 150, as well as 3 additional pixels that texture mapping engine 150 may request as part of the process of deriving the data for pixel 154 of object 152.

The number and configuration of pixels in a macroblock of a frame is usually known at the time motion compensation is being performed, as well as the order in which the pixels making up the macroblock will be filled with data derived from pixels copied from another frame. Therefore, unlike texture mapping, these more predictable aspects of motion compensation afford greater opportunities to realize efficiencies in making accesses to a RAM device in which a frame carrying pixels to be copied is kept by pre-fetching and caching larger quantities of data. Since the pixel boundaries of the pixels of a macroblock in one frame and the pixel boundaries of the pixels of an image used to fill the macroblock from another frame often do not match, it is often necessary to retrieve a block of pixels that has one more column and/or one more row of pixels than the macroblock. As a result, each pixel of a macroblock often must be derived from a weighted average of the pixel data comprising 2 or 4 adjacent pixels of the block of copied pixels. For these reasons, retrieving a block of pixels that is 2 rows high is often most desirable.

Frame 172 is a frame of motion video data to be displayed on display 190. As part of carrying out motion compensation to derive the data needed to fill macroblock 174 of frame 172, motion compensation engine 170 makes a request to pre-fetch logic 130 for a copy of a pixel of frame 176 carried in RAM device 110. Pre-fetch logic 130 responds to the request from motion compensation engine 170 by effecting the retrieval of multiple pixels from block of pixels 178 of frame 176, as well as the storage of those pixels in cache 132. The retrieved pixels contain the pixel requested by motion compensation engine 170, as well as additional pixels that motion compensation engine 170 may request as part of the process of filling macroblock 174 of frame 172.

The optimal number and 2-dimensional configuration of the pixels of macroblock 174 for which pixels will be copied from block of pixels 178 is based on factors such as the number of bits to which RAM device 110 can provide access at any given time, and how the pixels of frame 176 are organized among the storage locations of RAM device 110. The number of bits to which RAM device 110 can provide access at one time, divided by the number of bits required for each pixel derives the width in pixels of the portion of macroblock 174 for which it is optimal to request pixel data to fill. The manner in which the pixels of frame 176 are organized among the storage locations of RAM device 110 influences the height in pixels of the portion of macroblock 174 for which it is optimal to request pixel data to fill. As those skilled in the art will understand, if the pixels of frame 176 are organized among the storage locations of RAM device 110 such that the pixels comprise a single contiguous block of pixels, starting with the pixel at one end of either the top or bottom most row, progressing through successive pixels in that row, and progressing through successive rows in like manner, then it is likely that rows of pixels within block of pixels 178 will be split across different rows of storage locations within RAM device 110. In such a case, copying a portion of block of pixels 178 sufficient to fill a portion of macroblock 174 that is only 1 row of pixels high may be optimal, since this would result in the copying of only 1 or 2 rows of pixels from block of pixels 178, thereby reducing instances where rows in the organization of storage cells within RAM device are crossed during copying. Alternatively, if frame 176 is stored in a "tiled" manner such that the likelihood of the rows of block of pixels 178 being in different rows of storage locations within RAM device 110 is greatly reduced, then copying a portion of block of pixels 178 sufficient to fill a portion of macroblock 174 that is more than 1 row high may be optimal.

Pre-fetching 2-dimensional blocks of pixels from RAM device 110 affords advantages similar to those achieved by grouping pixel requests to create larger requests for multiple pixels, in one row (address grouping). However, this advantage is achieved without delaying the making of accesses to RAM device 110, and without augmenting either texture mapping engine 150 or motion compensation engine 170 with additional storage devices to store information needed for the processing of each outstanding request for a pixel until those pixels are retrieved following such a delay. Furthermore, varying the size of the 2-dimensional blocks of pixels from RAM device 110 allows pre-fetch logic 130 to pre-fetch quantities and configurations of pixels that are better suited to both texture mapping engine 150 and motion compensation engine 170.

In one embodiment, RAM device 110 is able to provide access to a maximum of 64 bits (hereinafter referred to as a "quadword") at any given time. Since a portion of the data for each pixel of frame 176 occupies 8 bits, RAM device 110 is able to provide access to data for a maximum of 8 pixels at a time. Furthermore, in this embodiment, the pixels of frame 176 are organized in a tiled manner among the storage locations of RAM device 110 such that each tile is 128 pixels wide. The amount of data that can be optimally pre-fetched from RAM device 110 in this embodiment for purposes of motion compensation is a quantity quadwords needed to fill a portion of macroblock 174 that is 8 pixels wide and 3 pixels high, and the amount of data that can be pre-fetched from RAM device 110 for purposes of texture mapping is a quantity comprising a 2×2 block of pixels from texture map 156.

In one embodiment, RAM device 110 is shared between a display system and other devices comprising a computer system to which the display system is coupled. In an alternate embodiment, RAM device 110 is coupled directly to a display system, and the other devices comprising a computer system to which the display system is coupled are coupled to another RAM device.

In one embodiment, pre-fetch logic 130 is combined with address generation logic used to provide the addresses of storage locations within RAM device 110 at which data for desired pixels in texture maps and/or frames are located. In this embodiment, texture mapping engine 150 and motion compensation engine 170 request desired pixels from texture maps and/or frames by specifying indices to tables or other indirect references, and pre-fetch logic 130 generates the appropriate addresses to retrieve data for the desired pixels and the additional pixels to be pre-fetched. In an alternate embodiment, pre-fetch logic 130 does not incorporate address generation logic, and texture mapping engine 150 and motion compensation engine 170 request desired pixels from texture maps and/or frames by directly specifying the appropriate addresses, and pre-fetch logic 130 simply expands the addresses to include other pixels to be pre-fetched.

An embodiment for pre-fetching pixel data is depicted in FIG. 2. Either a 2×2 block of pixels or a pixel data sufficient to fill an 8×3 block of pixels is retrieved from RAM device 290, depending on whether the data is for use in texture mapping or motion compensation. Although RAM device 290 could conceivably be designed to provide access to any number of bits in a single access, in this example, RAM device 290 is able to provide access to a maximum of one quadword (64 bits) at any given time. For this reason, RAM device 290 is depicted as a column of quadwords.

Pixel 202 is a pixel of an image of object 200, which is a 3-dimensional object being displayed in perspective. As part of the process of texture mapping, data is retrieved from texture map 292 stored in RAM device 290. Texture map 292 is a 2-dimensional block of pixels that could be of any size, but is shown as 16 pixels wide and 5 pixels high. The 16-pixel width of texture map 292 allows its rows to be mapped on quadword-aligned boundaries as shown. In this example, texture map 292 occupies 10 quadwords, quadwords 210 through 219, within RAM device 290.

As often occurs in texture mapping, pixel 202 of the image of object 200 requires texture data from more than one pixel of texture map 292, as shown, namely pixels 214a and 214b of quadword 214, and pixels 216a and 216b of quadword 216. In deriving data for pixel 202, a texture mapping engine (not shown) requests a copy of pixel 214a. Since the process being performed, namely texture mapping, is one for which pre-fetching of more than a block of 2×2 pixels has little likelihood of providing a benefit, the pre-fetch logic (also not shown) retrieves no more than the quadwords carrying a 2×2 block of pixels comprised of pixels 214a, 214b, 216a and 216b. This retrieval entails accessing quadwords 214 and 216 within RAM device 290. Quadwords 214 and 216 are not adjacent quadwords within RAM device 290, and therefore, this retrieval results in two non-contiguous accesses to RAM device 290, increasing the likelihood that a row boundary within the organization of storage locations of RAM device 290 will be crossed as an access is made first to one of these quadwords, and then to another. This, in turn, increases the likelihood of incurring the latencies inherent in crossing a row boundary. Only the quadwords carrying pixels 214a, 214b, 216a and 216b are stored in the cache (not shown) controlled by the pre-fetch logic, since as discussed earlier, there is often little advantage to pre-fetching more than this number of pixels in texture mapping.

Macroblock 250 is one of an array of macroblocks comprising a frame (not shown) of motion video on which motion compensation is being performed, with pixel data needing to be copied from frame 294 which is shown to be carried in RAM device 290. Macroblock 250 could be of any size, but is shown as a grid of 16×16 pixels in this example, in keeping with the most widely used size of macroblock used in widely accepted compression standards. Frame 294 is a frame of motion video data carrying an image that, as a result of the use of motion estimation, is referred to by the frame of which macroblock 250 is a part. As a result, the frame to which macroblock 250 belongs was stored or transmitted incomplete, but with a reference to the image carried by frame 294, and therefore, the frame to which macroblock 250 belongs must be at least partially reconstructed by copying the image from frame 294. Frame portion 296 is a portion of frame 294 that carries the image from which a copy is to be made. Frame portion 296 illustrates the relationship between the pixels of frame 294 and the quadword organization of storage locations within RAM device 290. In this example, each quadword of RAM device 290 that is employed in carrying a portion of frame 294, carries 8 bits of data for up to 8 of the pixels of frame 294.

As often occurs in the process of motion compensation, the image carried on a source frame such as frame 294 is shown with pixels having pixel boundaries that do not match the pixel boundaries of the pixels of the macroblock of the frame to which the image is being copied, such as the frame of which macroblock 250 is a part. The result is that a block of pixels that is one row and one column larger than the macroblock is required to be copied from the source frame. This situation is graphically illustrated with macroblock 250 being overlain atop a grid of 17×17 pixels in frame portion 296 such that each pixel of macroblock 250 requires data from 4 of these pixels of frame portion 296. In deriving data for pixel 254, a motion compensation engine (not shown) requests a copy of one of the 4 pixels needed from frame 294 that will be needed to carry out weighted averaging to derive a value for pixel 254. Since the process being performed, namely motion compensation, is one for which pre-fetching of a block of pixels larger than the 2×2 block of pixels needed for the processing of one macroblock pixel has some likelihood of providing some benefit, the pre-fetch logic expands the request made by the motion compensation engine.

The request made by the motion compensation engine is expanded into a request for all quadwords needed for the processing of all the pixels of block 252. The width of block 252 is based on the ability of RAM device 290 to supply a maximum of one quadword of data at any given time. In this example, each pixel takes 8 bits of a quadword, which allows RAM device 290 to provide data for up to 8 pixels per access, and this determines the width of block 252 as 8 pixels. The height of block 252 is based on various factors including, but not limited to, the effect that the manner in which the pixels being retrieved from RAM device 290 are organized among the storage locations of RAM device 290, as discussed earlier. In this example, the pixels of frame 294 are stored in a tiled manner, thereby decreasing the likelihood that retrieving quadwords from more than 1 row of pixels of frame 294 will result in an access to RAM device 290 that crosses row boundaries within RAM device 290. Furthermore, in this example, an analysis of various factors, including the frequency with which row boundaries within RAM device 290 are likely to be encountered, has determined that retrieving enough quadwords to fill 3 rows, resulting in an 8×3 block, is determined to be optimal. The expansion of the request originally made by the motion compensation engine for pixel data needed to derive pixel 254 into a request for all quadwords carrying data needed to fill block 252 results in quadwords 263*a* through 263*c*, 264*a* through 264*c*, 265*a* through 265*c* and 266*a* through 266*c* being copied from RAM device 290. As shown, the request for these quadwords results in 4 non-contiguous accesses to RAM device 290.

This same expansion of requests for data made by the motion compensation engine is carried out for every pixel of macroblock 250, as motion compensation is performed on each pixel and the motion compensation engine makes requests for pixel data needed to derive data. If the expansion of a request for data for a single pixel of macroblock 250 results in a request for an 8×3 block of pixels that requires only quadwords of pixel data that have already been retrieved in answer to a previous expanded request, then the needed data for the pixel for which the original request was made is drawn from the cache.

In embodiments where motion compensation is performed starting with the upper left most pixel of macroblock 250 and proceeding to the lower right most pixel, further efficiencies could be realized by eliminating the unnecessary retrieval of quadwords carrying data that would be useful only for performing motion compensation on pixels that are beyond the right or bottom boundaries of macroblock 250. In one embodiment, such efficiencies could be realized by configuring the pre-fetch logic to switch the expansion of requests made by motion compensation engine from a larger block to a smaller block. In the depicted example, a smaller block, such as a 2×2 block, may be substituted for an 8×3 block, whenever motion compensation is performed on a pixel in one of the 8 right most columns of macroblock 250. In another embodiment, such efficiencies could be realized by configuring the pre-fetch logic to expand requests only in columns within macroblock 250 where the expanded request would not result in the inclusion pixels beyond the right edge of macroblock 250. In the depicted example, the expansion of requests to an 8×3 block would occur only for pixels not within the 7 right most columns of macroblock 250. The result would be that requests made for pixels within the column just to the left of those 7 columns would result in the retrieval of all quadwords needed for pixels within those 7 columns. In still another embodiment, such efficiencies could be realized by configuring the pre-fetching logic to not carry out the retrieval of quadwords carrying data that would be applicable only to pixels below the bottom edge of macroblock 250, despite the occurrence of expanded requests that would include those quadwords.

Figure 3:
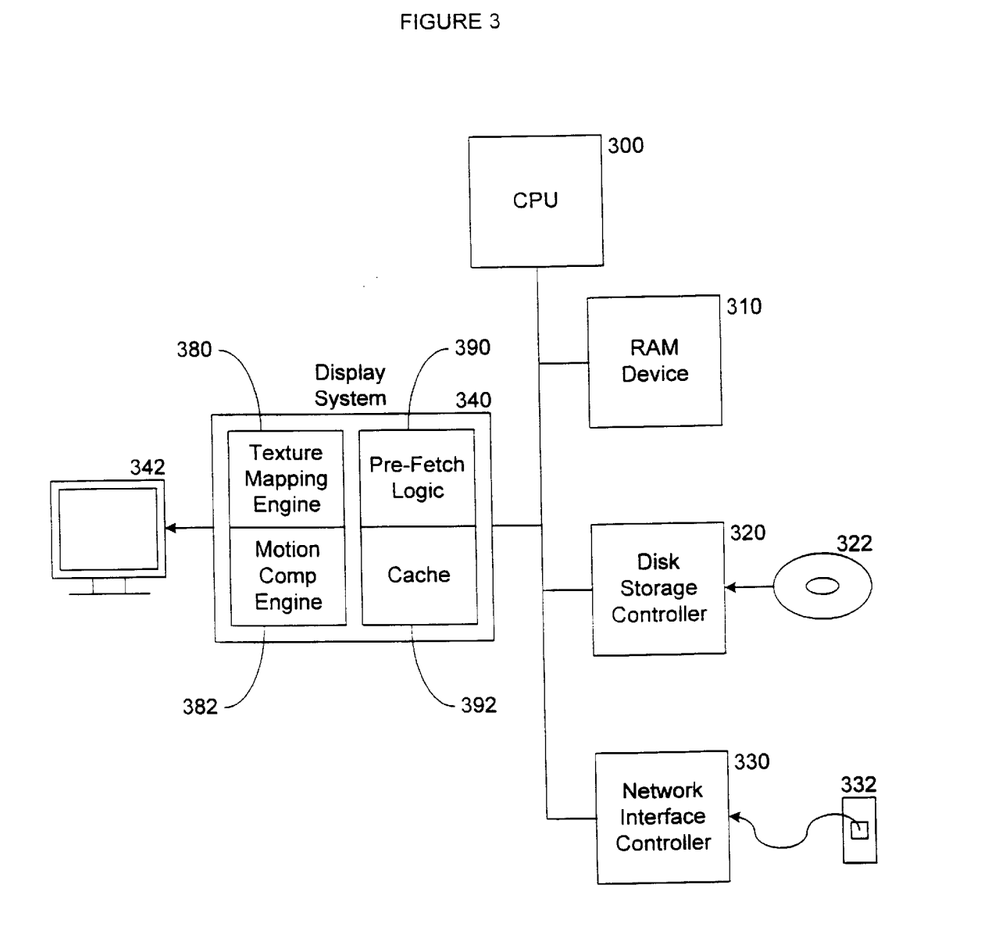
FIG. 3 is a simplified block diagram of one embodiment of a computer system.

An embodiment of a computer system is depicted in FIG. 3, and includes a CPU 300, a RAM device 310, a disk storage controller 320 coupled to disk storage media 322, a network interface controller 330 coupled to a network is 332, and a display graphics system 340 coupled to a display 342. Included within display system 340 is texture mapping engine 380, motion compensation engine 382, pre-fetch logic 390 and cache 392.

Texture mapping engine 380, motion compensation engine 382, and CPU 300 may all require access to data carried by RAM device 310. To perform texturing mapping and motion compensation, texture mapping engine 380 and motion compensation engine 382, respectively, may need to retrieve pixel data from texture maps and frames, respectively, contained within RAM device 310. As discussed earlier, due to the manner in which pixel data is often stored, such retrievals of pixel data by texture mapping engine 380 and motion compensation engine 382 are likely to result in non-contiguous accesses to storage locations within RAM device 310. To counteract the afore described latencies likely to be incurred as a result of such non-contiguous accesses, texture mapping engine 380 and motion compensation engine 382 make use of pre-fetch logic 390 and cache 392.

Pre-fetch logic 390 receives requests for pixel data from texture mapping engine 380 and motion compensation engine 382, and expands those requests to retrieve pixel data the often comprises a 2-dimensional block of pixels from RAM device 310, with the retrieved pixel data being stored in cache 392. As described earlier, the pre-fetch logic alters the width and height of the 2-dimensional blocks of pixels retrieved from RAM device 310 in response to which engine is requesting pixel data.

The invention has been described in conjunction with the preferred embodiment. It is evident that numerous alternatives, modifications, variations and uses will be apparent to those skilled in the art in light of the foregoing description.

It will be understood by those skilled in the art, that the present invention may be practiced in support of other combinations of functions in a display system in addition to or in lieu of texture mapping and/or motion compensation where the pre-fetching of pixel data is effective to differing degrees.

What is claimed is:

1. A method for pre-fetching pixels of pixel data for at least two display functions requiring the retrieval of pixels from a storage device for which the degree of effectiveness of pre-fetching differs among the at least two display functions, comprising:

receiving at least one request to retrieve at least one pixel of data from the storage device;

expanding the at least one request to retrieve at least one pixel into at least one request to retrieve at least one 2-dimensional block of pixels, the width and height of which vary depending on which one of the at least two display functions will be performed on the pixels retrieved; and retrieving a quantity of data that comprises at least one 2-dimensional block of pixels from the storage device.

2. The method of claim 1 wherein the degree of effectiveness of pre-fetching pixels for at least one of the at least two display functions is limited such that the at least one 2-dimensional block of pixels retrieved from the storage device is 2 pixels in height and in width.

3. The method of claim 1 wherein the degree of effectiveness of pre-fetching pixels for at least one of the at least two display functions is such that the width of the at least one 2-dimensional block of pixels retrieved from the storage device is determined by a quantity of data that can be retrieved from the storage device in a single access operation.

4. The method of claim 1 wherein the storage device is a dynamic random access memory with storage locations organized in rows and columns such that accesses that cross between rows incur greater latencies than accesses that cross between columns, and the degree of effectiveness of pre-fetching pixels for at least one of the at least two display functions is such that the height of the at least one 2-dimensional block of pixels retrieved from the storage device is determined, at least in part, by how the desired pixels are organized in storage among the storage locations of the storage device, and at least in part, by an estimation of how frequently an access to pre-fetch a 2-dimensional block of pixels will cross between rows within the storage device.

5. The method of claim 1 wherein at least one of the at least two display functions is texture mapping.

6. The method of claim 1 wherein at least one of the at least two display functions is motion compensation.

7. Pre-fetching logic for pre-fetching pixels of pixel data for at least two display functions requiring the retrieval of pixels from a storage device for which the degree of effectiveness of pre-fetching differs among the at least two display functions, comprising:

means for receiving at least one request to retrieve at least one pixel of data from the storage device;

means for expanding the at least one request to retrieve at least one pixel into at least one request to retrieve at least one 2-dimensional block of pixels, the width and height of which vary depending on which one of the at least two display functions will be performed on the pixels retrieved; and means for retrieving of a quantity of data that comprises at least one 2-dimensional block of pixels from a storage device.

8. The pre-fetching logic of claim 7 wherein the degree of effectiveness of pre-fetching pixels for at least one of the at least two display functions is limited such that the at least one 2-dimensional block of pixels retrieved from the storage device is 2 pixels in height and in width.

9. The pre-fetching logic of claim 7 wherein the degree of effectiveness of pre-fetching pixels for at least one of the at least two display functions is such that the width of the at least one 2-dimensional block of pixels retrieved from the storage device is determined by a quantity of data that can be retrieved from the storage device in a single access operation.

10. The pre-fetching logic of claim 7 wherein the storage device is a dynamic random access memory with storage locations organized in rows and columns such that accesses that cross between rows incur greater latencies than accesses that cross between columns, and the degree of effectiveness of pre-fetching pixels for at least one of the at least two display functions is such that the height of the at least one 2-dimensional block of pixels retrieved from the storage device is determined, at least in part, by how the desired pixels are organized in storage among the storage locations of the storage device, and at least in part, by an estimation of how frequently an access to pre-fetch a 2-dimensional block of pixels will cross between rows within the storage device.

11. The pre-fetching logic of claim 7 wherein at least one of the at least two display functions is texture mapping.

12. The pre-fetching logic of claim 7 wherein at least one of the at least two display functions is motion compensation.

13. Pre-fetching logic for pre-fetching pixels of pixel data for at least two display functions requiring retrieval of pixels from a storage device for which the degree of effectiveness of pre-fetching pixels differs among the at least two display functions, wherein the pre-fetching logic varies the width and height of at least one pre-fetched 2-dimensional block of pixels depending on which one of the at least two display functions will be performed on the pre-fetched pixels.

14. The pre-fetching logic of claim 13, wherein the degree of effectiveness of pre-fetching pixels for at least one of the at least two display functions is limited such that the height and width of the at least one pre-fetched block of pixels is 2 pixels.

15. The pre-fetching logic of claim 13, wherein the degree of effectiveness of pre-fetching pixels for at least one of the at least two display functions is such that the width of the at least one pre-fetched 2-dimensional block of pixels must be limited by the pre-fetching logic to the number of pixels that can be retrieved from the storage device in a single access operation.

16. The pre-fetching logic of claim 13, wherein the at least one pre-fetched 2-dimensional block is retrieved from a dynamic random access memory with storage locations organized in rows and columns such that accesses that cross between rows incur greater latencies than accesses that cross between columns, and the degree of effectiveness of pre-fetching pixels for at least one of the at least two display functions is such that the height of the at least one pre-fetched 2-dimensional block of pixels retrieved from the storage device is varied by the pre-fetching logic, at least in part, in response to how the desired pixels are organized in storage among the storage locations of the storage device, and at least in part, in response to an estimation of how frequently an access to pre-fetch a 2-dimensional block of pixels will cross between rows within the storage device.

17. The pre-fetching logic of claim 13 wherein at least one of the at least two display functions is texture mapping.

18. The pre-fetching logic of claim 13 wherein at least one of the at least two display functions is motion compensation.

19. The pre-fetching logic of claim 13 wherein the pre-fetching logic is comprised of an address generator of a display system that varies the height and width of the at least one pre-fetched 2-dimensional block of pixels by generating a varying quantity of additional addresses.

20. A computer system, comprising:
   at least one CPU;
   at least one random access storage device;
   at least one display system coupled to the at least one random access storage device which performs at least two display functions requiring the retrieval of pixels of pixel data from the at least one random access storage device for which the degree of effectiveness of pre-fetching pixels differs among the at least two display functions, and which includes pre-fetching logic that varies the width and height of at least one pre-fetched 2-dimensional block of pixels depending on which one of the at least two display functions will be performed on the pre-fetched pixels.

21. The computer system of claim 20, wherein the degree of effectiveness of pre-fetching pixels for at least one of the at least two display functions is limited such that the height and width of the at least one pre-fetched block of pixels is 2 pixels.

22. The computer system of claim 20, wherein the degree of effectiveness of pre-fetching pixels for at least one of the at least two display functions is such that the width of the at least one pre-fetched 2-dimensional block of pixels must be limited by the pre-fetching logic to the number of pixels that can be retrieved from the random access storage device in a single access operation.

23. The computer system of claim 20, wherein the at least one random access storage device has storage locations organized in rows and columns such that accesses that cross between rows incur greater latencies than accesses that cross between columns, and the degree of effectiveness of pre-fetching pixels for at least one of the at least two display functions is such that the height of the at least one pre-fetched 2-dimensional block of pixels retrieved from said random access storage device is varied by the pre-fetching logic, at least in part, in response to how the desired pixels are organized in storage among the storage locations of said random access storage device, and at least in part, in response to an estimation of how frequently an access to pre-fetch a 2-dimensional block of pixels will cross between rows within said random access storage device.

24. The computer system of claim 20 wherein at least one of the at least two display functions is texture mapping.

25. The computer system of claim 20 wherein at least one of the at least two display functions is motion compensation.

26. The computer system of claim 20, wherein the at least one CPU is coupled to and configured to use said random access storage device such that use of said random access storage device is shared between said at least one CPU and said at least one display system.

* * * * *

UNITED STATES PATENT AND TRADEMARK OFFICE
CERTIFICATE OF CORRECTION

PATENT NO. : 6,570,574 B1
DATED : May 27, 2003
INVENTOR(S) : Cook

It is certified that error appears in the above-identified patent and that said Letters Patent is hereby corrected as shown below:

<u>Column 1,</u>
Line 37, before "displaying", insert -- In --.

<u>Column 8,</u>
Line 31, after "network", delete "is".

Signed and Sealed this

Twenty-fifth Day of November, 2003

JAMES E. ROGAN
*Director of the United States Patent and Trademark Office*